United States Patent [19]

Flynn et al.

[11] 4,032,044
[45] June 28, 1977

[54] LIQUID DISPENSING UNIT AND SYSTEM

[75] Inventors: Jac B. Flynn, Elgin; Jerry C. Janquart, Crystal Lake; Werner K. Priese, Barrington, all of Ill.

[73] Assignee: Hills-McCanna Company, Carpentersville, Ill.

[22] Filed: Mar. 8, 1976

[21] Appl. No.: 664,556

[52] U.S. Cl. .............................. 222/135; 222/263; 222/288; 222/340; 222/380
[51] Int. Cl.² ...................... G01F 11/08; B67D 5/52
[58] Field of Search ........... 417/328, 402; 222/135, 222/136, 144.5, 214, 263, 340, 288, 380

[56] References Cited

UNITED STATES PATENTS

| | | | |
|---|---|---|---|
| 1,295,451 | 2/1919 | Duffey | 222/263 |
| 1,339,237 | 5/1920 | Thompson | 222/263 |
| 2,690,859 | 10/1954 | Snyder | 222/263 X |
| 3,203,595 | 8/1965 | Berkowitz | 222/144.5 X |

*Primary Examiner*—Drayton E. Hoffman
*Assistant Examiner*—David A. Scherbel
*Attorney, Agent, or Firm*—Olson, Trexler, Wolters, Bushnell & Fosse, Ltd.

[57] ABSTRACT

There is disclosed a system and dispensing unit for the controlled and metered dispensing of a liquid product, or of two or more liquid products, which should be combined in the right proportions only shortly before ultimate usage. The basic system, as disclosed, employs a single pressure source for pressurization of the liquid product and the pressurized dispensing of the liquid product from the dispensing unit, per se. In addition to the basic illustrated system, there are disclosed novel dispensing units which enables the dispensing of a uniform or proportioned amount of liquid upon each operation thereof. Further, these units are constructed so as to permit the dispensing of several different liquids simultaneously from the same unit, or the selected dispensing of the individual liquid.

32 Claims, 20 Drawing Figures

LIQUID DISPENSING UNIT AND SYSTEM

BACKGROUND OF THE INVENTION

The present invention pertains to a system and dispensing unit for liquids, and more particularly to a system and unit wherein a number of liquids, like condiments, may be dispensed, with controlled proportioning thereof.

One of the fastest growing industries in the country today is that of the fast food franchise. Rising costs, both as to food and labor, has necessitated the employment of labor and time-saving devices to perform the various operations required in the preparation of the final product. One such operation which has caused some concern is the efficient and controlled dispensing of condiments such as ketchup, mustard, or the like, as used on hamburgers and other types of sandwiches. In this regard, concern exists not only with the saving of labor, but also for the attaining of controlled, uniformity in the amount of condiment dispensed on to each item, so as to maintain flavor standards as well as minimize the waste wth regard to said condiments.

The condiment dispensing unit and system of the present invention provide numerous advantages, which were not attainable with prior systems. To name but a few of these advantages, the system of the present invention employs a single source of pressure which is used for both supply of the pressurized condiment product to the dispensing unit, and also for attaining a positive discharge of the condiment product from the unit per se. Accordingly, the uniform amount of condiment product is dispensed upon each operation of the unit. Further, the present invention envisions dispensing units which are capable of dispensing two or more condiments simultaneously, or separately, upon each operating cycle. In addition, the dispensing units as disclosed and discussed hereinafter are such that the volume of condiment dispensed is uniform with each operation, and can be altered as desired. In addition, the units have been designed for ease in cleaning.

The structure of the preferred embodiments of the dispensing units and the overall system which enable attainment of the above-mentioned advantages, and others, will now be discussed in conjunction with the drawings.

DESCRIPTION OF THE ILLUSTRATED EMBODIMENTS

Figure 1:
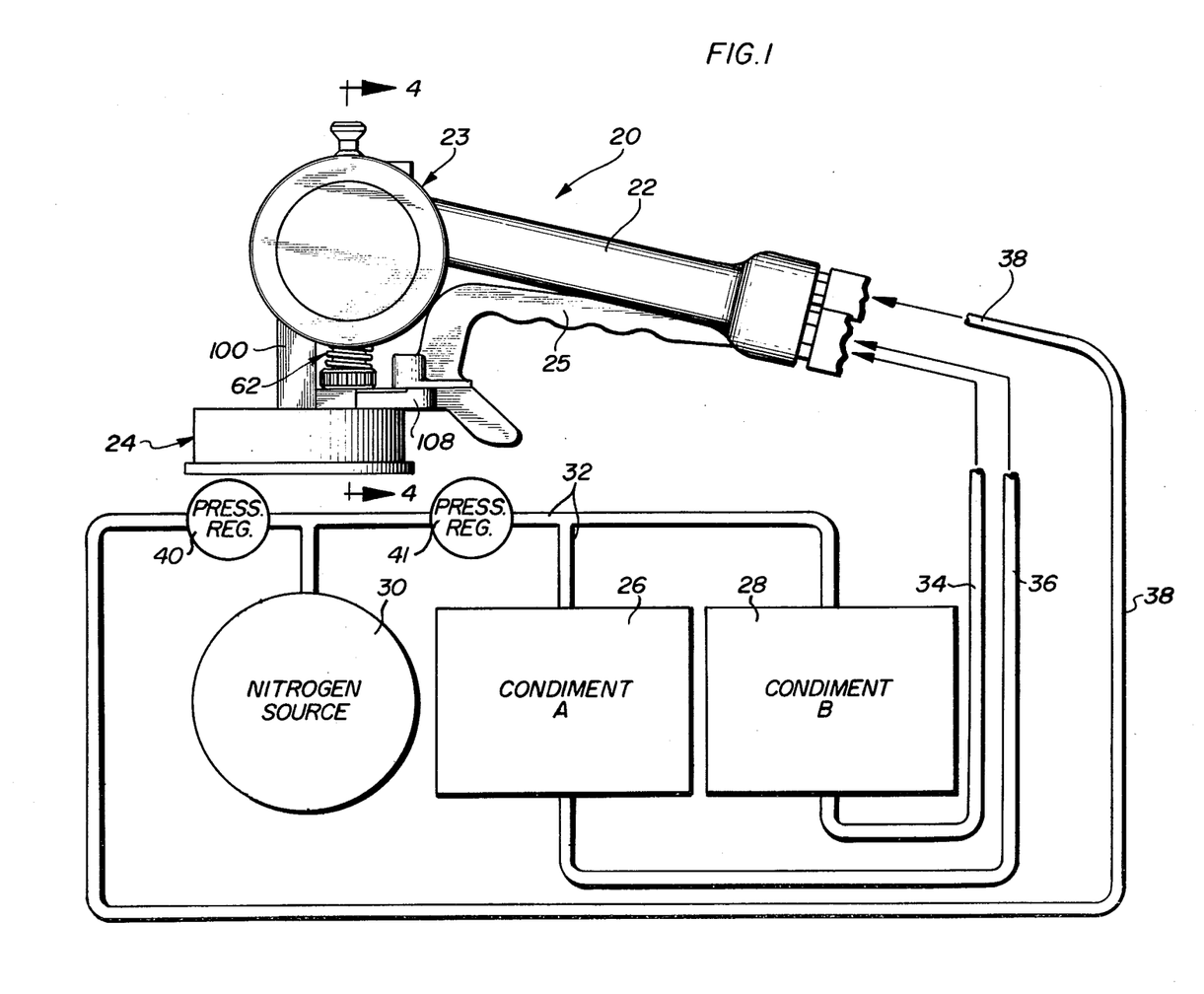
FIG. 1 is a schematic representation of the condiment dispensing system of the present invention, with a preferred type of dispensing unit illustrated therewith.

Turning now to the drawings, FIG. 1 illustrates a novel, overall system for the dispensing of liquid products, such as condiments, or the like. The dispensing unit as shown in FIG. 1 is that as further illustrated in FIGS. 2–10 and constitutes one preferred type of unit of the present invention. FIGS. 11–20 illustrate a second or alternate dispensing unit construction, which is also designed for use with the system as shown in FIG. 1.

It should be noted that while the present invention was developed primarily for use with condiments such as ketchup and mustard, use thereof is not limited in this regard. That is to say, that it is envisioned, and indeed intended that the basic concepts of the present invention, as defined in the claims appended hereto, may be adapted for the controlled dispensing of other types of liquid products. It is also envisioned that those skilled in the art, upon becoming aware of the present invention, may devise various alterations and modifications which, while differing structurally from those as specifically disclosed in the drawings, still fall within the spirit and scope of the invention, as defined in the aforementioned appended claims.

Attention is now directed to the drawings, and initially to FIG. 1 wherein the basic system is shown in a generally schematic form. In this regard, there is employed a dispensing unit, designated generally 20, which includes a handle 22, a main body or metering section 23 and a dispensing head 24. The handle 22 includes a lever 25 which, when depressed, effects dispensing of a controlled amount of condiment product. The condiments to be dispensed, which are designated A and B for reference purposes, are contained within suitable storage vessels 26 and 28, respectively, which are schematically illustrated in FIG. 1. The storage vessels 26 and 28 may be of various known designs which enable pressurization of the condiment products stored therein. Pressurization of the condiment liquid products A and B in storage vessels 26 and 28 is obtained through a source of pressure 30 operatively connected to the respective storage containers 26 and 28 by pressure line 32. Preferably nitrogen gas is employed as the pressure medium, in that this gas has been found acceptable for use with food products. Pressurized liquid condiments A and B are supplied from the storage units 26 and 28 via supply lines 34 and 36 which are directly connected to the dispensing unit 20.

As discussed previously, the system and dispensing unit 20 of the present invention envision the use of a positive pressure displacement in the dispensing of the condiment product. To achieve this result, the pressure source 30 is also connected to the dispensing unit 20 through a pressure line 38. A first pressure regulator 40 is disposed in line, 38, while a second pressure regulator 41 is disposed in line 32, and the regulators 40 and 41 are adjusted such that the actual pressure of the medium as delivered to the unit 20 in the dispensing of the condiment product, is less than the pressure level at which the condiment products A and B are maintained and at which they are supplied to the dispensing unit 20. The purpose for maintaining this pressure difference will become apparent from the description of the preferred embodiments for the dispensing unit, as shown in the drawings. It should be noted, however, that by selective control of the pressure differentials created within the dispensing unit 20, it is possible to attain both accurate supply and dispensing of a metered amount of product through a positive displacement.

Attention is now directed to FIGS. 2–5, wherein the dispensing unit 20 is illustrated in detail. In this regard, it should be noted that the unit 20 as shown is designed to accommodate and attain dispensing of two separate liquid condiment products, i.e. A and B without the co-mingling thereof. In this regard, as will become apparent from the discussion to follow, that each product may be dispensed separately, or both products may be dispensed together, upon a single instance of operation of the unit 20. Further, the structural features and component elements which define or make up the portion of unit 20 employed in dispensing product A are generally identical to those components or structures utilized in the dispensing of product B, with the exception of dimensional variations. Accordingly, the unit 20 will be described initially with reference to only one half thereof, it being understood that the opposite side is of generally identical construction. In this regard, similar reference characteristics will be used for the like components.

Figures 2, 3:
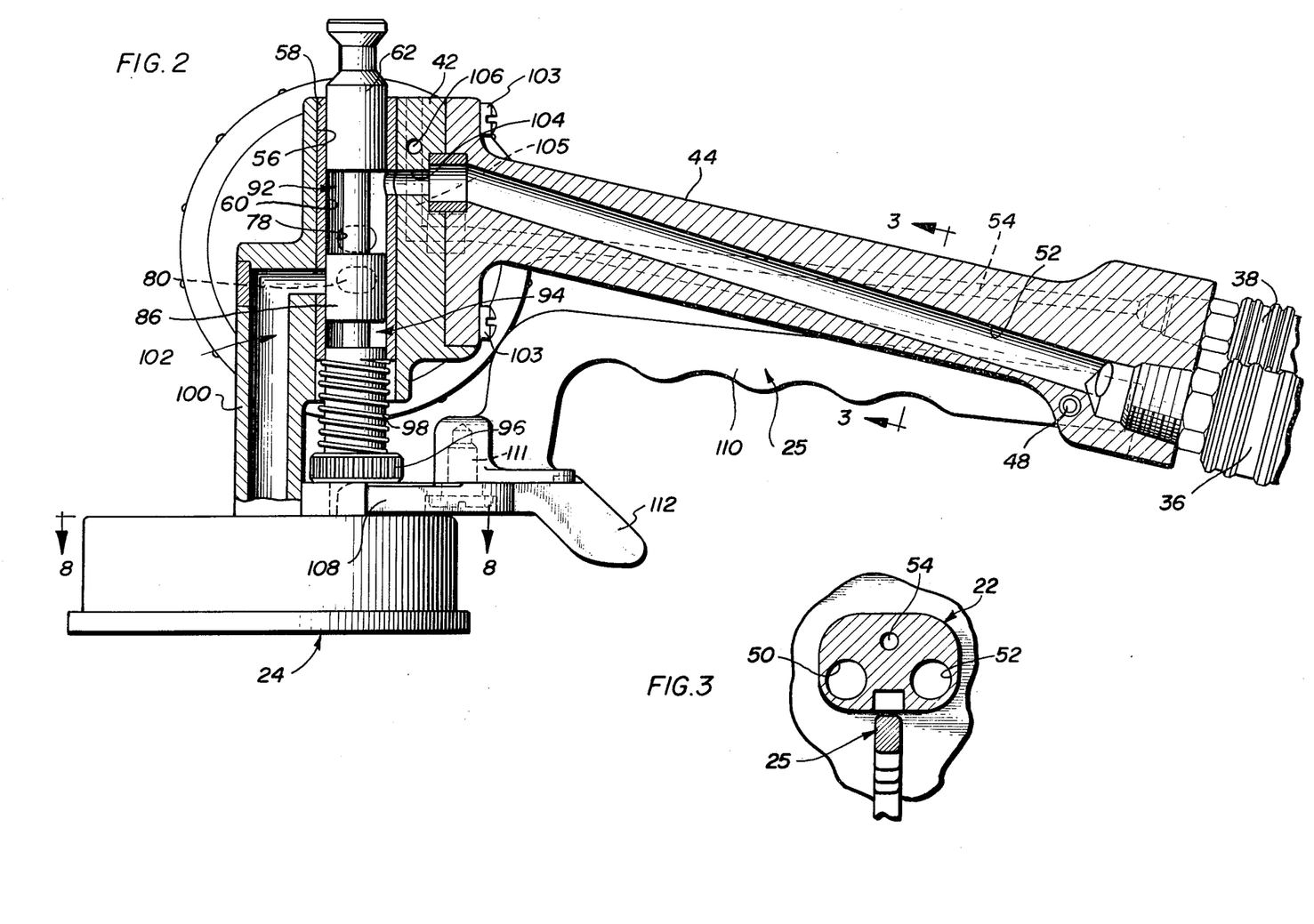
FIG. 2 is an elevational view, partially in section of a preferred dispensing unit design.
FIG. 3 is a partial sectional view taken along the line 3—3 of FIG. 2.

Keeping in mind the discussion in the preceding paragraph, it should be noted that the unit 20 includes a main body section 42 to which the handle assembly 22 is affixed as shown in FIG. 2. The handle assembly 22 includes an elongate section 44 to which is pivotally connected the lever 25 at a location designated 48. In addition, the elongate handle section 44 includes at least three bores extending the length thereof, oriented generally as shown in FIG. 3. The bores for purposes of reference are designated 50, 52 and 54 and each is provided with an internal thread at the free end of the handle remote from the main body section 42, to receive appropriate fittings for connection to the condiment supply line 34 and 36 and the pressure supply line 38, as is generally shown in FIG. 2. In this regard, please note that only the product supply line 36 and pressure line 38 are visible in FIG. 2. As such, the bores 50 and 52 are operatively connected to the condiment or product supply lines 34 and 36, respectively, while the bore 54 is in communication with the source of pressure 30 through the pressure line 38 and pressure regulator 40.

The main body section 42 includes a through opening 56 in which a bearing sleeve 58 is disposed. The sleeve 58 in turn includes a valve bore 60. If only one condiment is to be dispensed, only one sure bore need be provided, on the other hand, if two or more condiments are to be dispensed, the sleeve will include a valve bore 60 for each such condiment. In this regard, the illustrated embodiment of the invention envisions the dispensing of two different and distinct condiment products, thus two such valve bores 60 are provided, see FIG. 4. A valve member or spool 62 is slidably disposed in the bore 60, the general construction of which will be discussed in detail hereinafter.

Figure 4:
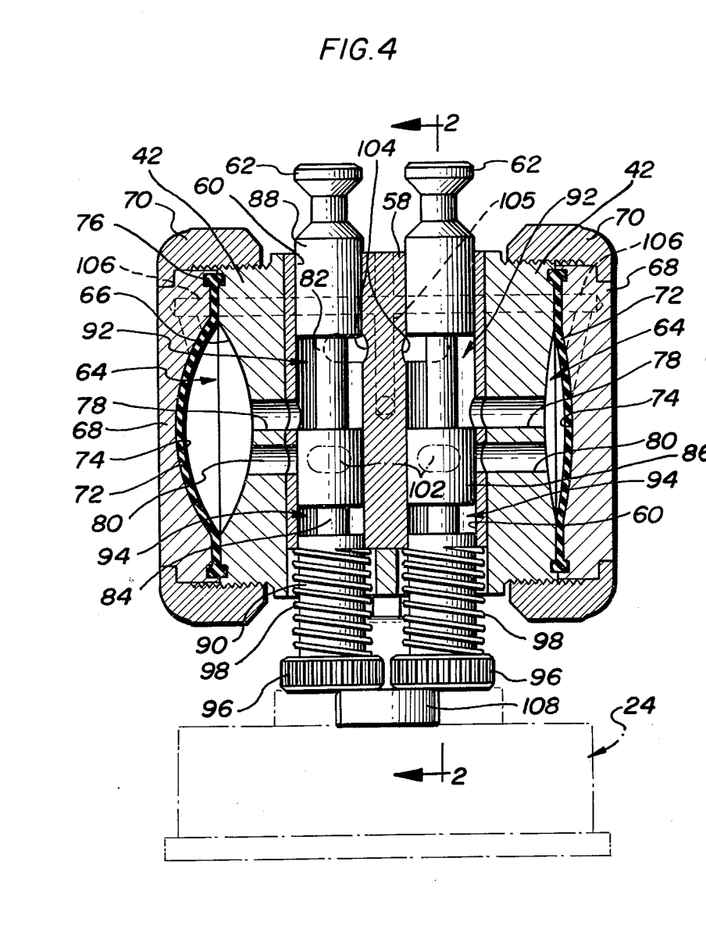
FIG. 4 is a sectional view taken along the line 4—4 of FIG. 1 with the dispensing head of the unit being illustrated in phantom, which figure illustrates the condition of the unit elements upon the supply of pressurized condiment products.

With specific reference to FIG. 4, a metering chamber 64 is provided at a location laterally offset from the valve member 62. In this regard, the main body portion 42 is provided with a concavity 66 sized in relation to the desired volume of condiment to be dispensed from unit 20. A limit plate member 68 is secured in overlying relation to the concavity 66 by a threaded gland 70. A flexible diaphragm 72 is clamped between the limit plate member 68 and the main body 42 which diaphragm overlies concavity 66 to define therewith the metering chamber 64. In the embodiment of FIG. 4, the limit plate member 68 also includes a concavity 74 which limits the expansion of the diaphragm 72 in a direction away from concavity 66. The diaphragm 72 may further include an annular peripheral bead 76 which is received in opposed grooves formed in the limit plate member 68 and body member 42 to achieve the desired sealing effect. With the embodiment as illustrated in FIG. 4, the effective volume of the metering chamber is defined by the opposed concavities 66 and 74. It should be noted, however, that the concavity 66 may be made sufficiently deep to provide the required volume, thus eliminating the need for a corresponding concavity in limit plate member 68, as is shown in the alternate embodiment of FIGS. 11–20, to be discussed later.

With continued reference to FIG. 4, the metering chamber 64 is in communication with the valve bore 60 through a pair of parallel ports 78 and 80, which open into chamber 64 and bore 60, and are offset axially with respect to said bore 60. The upper port 78 is in the embodiment of FIG. 4, the inlet port and the lower port 80 functions as the outlet or discharge port for chamber 64.

The valve member or members 62, as the case may be, each include a pair of spaced reduced diameter sections 82 and 84 separated by a valving portion 86 which is sized to engage the valve bore 60 in sealed, sliding contact. A pair of axially spaced end sections 88 and 90 are provided which are also in sealed sliding contact with the bore 60. If necessary, sealing ring of the O-ring type or some other well-known design may be employed to achieve the necessary protection against leakage; one example of a sealing arrangement being employed and shown in the alternate embodiment of FIG. 11.

Accordingly, the reduced diameter sections 82 and 84, in conjunction with the larger diameter sections 86, 88 and 90, cooperate with the bore 60 to define a pair of spaced separated chambers. The upper one of said chambers, as viewed, is termed the supply chamber and is designated by the reference character 92; the lower chamber being termed the discharge chamber, is designated by reference character 94.

Each of the valve members 62 extend outwardly from the bottom of the main body portion 42 and include an enlarged end section 96. Biasing means 98 in the form of a spring is provided and is disposed between each said end section 96 and the lower edge of the bearing sleeve 58, thus tending to urge the valve members 62 downwardly to the general positions as shown in FIGS. 2 and 4.

As can be seen in FIG. 4, while the general construction of the valving elements 62 is the same for each metering chamber 64, the respective volume of the chambers 64 differ. Except for this distinction, the overall construction of the unit 20 for each said chamber 64 is identical.

With reference to FIG. 2, it can be seen, that the main body section 42 includes a forward extension or housing segment 100, with discharge passages 102 formed therein, one said discharge passage communicating with each of the valve bores 60 at a level equal to or below the location at which the discharge ports 80 open to the respective said valve bores 60. It should be noted that while the location of the inlet port 78 and the outlet port 80 are shown in dotted outline in FIG. 2, this has been done for purposes of illustration and description, as these ports are in fact formed in the section of the main body portion 42 which has been broken away in said FIG. 2.

Affixed to the extension or housing segment 100, is the dispensing head 24, which is constructed, to maintain the separation between the respective condiment products A and B during dispensing. The construction of the head 24 will be detailed hereinafter with regard to FIGS. 8–10.

Directing attention back to FIG. 2, the handle 22 is affixed to the main body section 42 by suitable fastener means, such as screws 103. The main body section 42 is provided with condiment supply passages 104 opening into the valve bore 60, at a level equal to or slightly above that of the respective inlet ports 78. The product supply passages 104 are in direct communication with the bores 50 and 52, and thus a path for the supply of pressurized condiment product is provided from the containers 26 and 28, to the respective valve bores 60.

It will be recalled further, that the handle 22 is also provided with a bore 54 that is connected to the source of pressure 30 through the pressure regulator 40 and pressure line 38. The main body section 42 also includes a series of interconnected passages, which communicate with the bore 54 and provide a path for the pressure medium opening to the side of the diaphragm 72 opposite the metering chamber 64. These passages are all shown in dotted outline in FIGS. 2, 4 and 5, with the exception of one branch thereof in FIG. 2. More specifically, the pressure supply passages formed in the main body 42 include a first or main branch 105 of a generally L-shaped configuration which communicates directly with the bore 54 in handle 22. A pair of secondary branches 106 extend in opposite direction from the main branch 105 and are disposed transverse to said main branch 105. The secondary branches 106 extend into the respective limit plate members 68 and each include a segment which opens through the concavity 74 formed in the limit plate members 68.

Accordingly, as the basic construction of unit 20 has been described, the general or overall operation thereof will now be considered. In this regard, the specific construction of the end of the lever 25 which enables selective dispensing of one or the other or both of said condiment products A and B will be detailed hereinafter in conjunction with FIGS. 6 and 7. Directing attention first to FIGS. 2 and 4, the condition of the valve elements in the initial or supply position are shown, with the spring members 98 urging the respective valve members 62 downwardly against a stop or abutment provided by the free end 108 of lever 25. When valve members 62 are positioned as shown, the supply passages 104 are in communication with the condiment or product supply chambers 92, which chambers 92 are also in communication with the inlet ports 78, thus presenting a path for the pressurized condiment product to enter the metering chambers 64. In this initial condition the valve segments 86 of the respective valve members 62 will be oriented to block the outlet ports 80, for each metering chamber 64.

With reference to the prior discussion concerning the function of the pressure regulator 40, it will be recalled that the pressure medium supplied via the bore 54 and the passages 105 and 106 to the side of the diaphragm 72 opposite chamber 64 is maintained at a level less than the pressure of the condiment product in lines 50 and 52. Accordingly, as the pressurized condiment products enters the respective metering chambers 64, a pressure differential is created across the diaphragms 72 which overcomes any forces established on the side of said diaphragms opposite said chambers 64 by the pressure medium supplied thereto. The diaphragms 72 will thus expand into engagement with the limit plate 68 under the resultant force, enabling each metering chambers 64 to be filled completely with a predetermined volume of condiment product.

Figure 5:
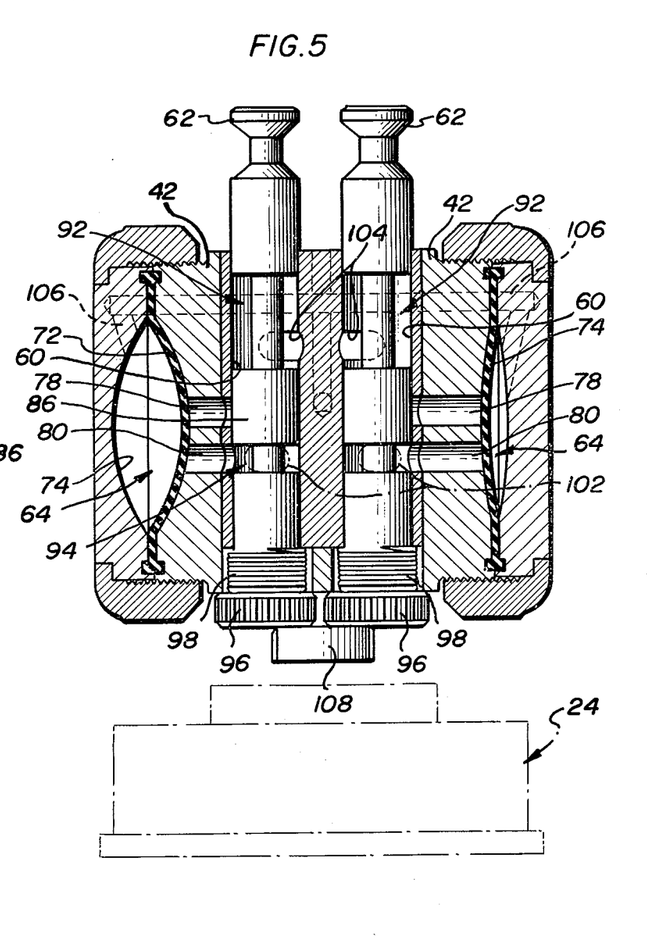
FIG. 5 is a sectional view similar to FIG. 4 illustrating the position of the elements upon dispensing of the condiment products.

Upon operation of the unit by depressing or squeezing of lever 25, the free end 108 of said lever will move upwardly against the sections 96, biasing the valve members 62 to the discharge position, as shown in FIG. 5. When this occurs, the valve segment 86 of each valve member 62 also moves upwardly to block the respective inlet ports 78, thereby interrupting the supply of pressurized condiment product to the respective metering chambers 64. This movement of the valve members 62 also produces alignment of the discharge chambers 94 with the respective outlet ports 80 and the associated discharge passages 102 which it will be recalled also, open to the bores 60. Since the dispensing head 24 with which passages 102 communicate opens to the atmosphere, and the supply of pressurized product to metering chambers 64 has been interrupted, the pressure of the condiment product in the respective chambers is reduced when the condition of FIG. 5 is reached. There is now created a pressure differential across the diaphragms 72 in a direction opposite to those created upon the initial supply of pressurized product to said chambers 64. This new or oppositely disposed pressure differential creates a resultant force on the diaphragms 72 causing them to move away from the limit plate members 68 and into engagement with the surfaces of the respective concavities 66 in the main body section 42. As can be appreciated, the volume of metering chamber 64 is thus reduced and a predetermined amount or volume of condiment, directly related to the volume of the chamber 64, is forced from each said chamber into the associated outlet port 80 and discharge chamber 94.

Assuming that initially the discharge chambers 94, discharge passages 102 and the dispensing head 24 are filled with the respective condiment products A and B from prior operations, it can be appreciated that upon each depression of the lever 25, a specified, predetermined amount of condiment A and condiment B will be dispensed from head 24. The precise amount of condiment dispensed from each metering chamber, being determined by the volume thereof, which is easily controlled. It should be noted further, that the limit plates 68 are removably assembled to the main body 42, and thus the volume of each condiment dispensed can be adjusted by the provision of alternate limit plate members having deeper or shallower concavities than those as illustrated.

As an additional factor, it should be noted that while separate inlet and outlet ports 78 and 80 are shown for each chamber 64 in the illustrated embodiment, it is indeed possible, and in fact is envisioned in certain circumstances, that a single port providing both the inlet and outlet port means may be utilized. In this regard, the utilization of spaced ports 78 and 80 is preferred, in that this arrangement provides a continuous or through path for the condiment product, which reduces, if not eliminates from this embodiment, any danger that dead spaces may result in which condiment product may become trapped and subsequently spoil.

Figure 6:
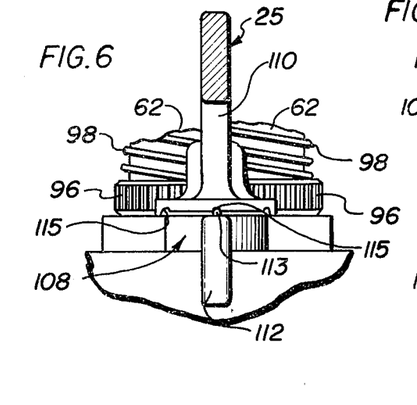
FIG. 6 is a view taken generally along the lines 6—6 of FIG. 2 illustrating the relationship of the free end of the operating lever to the valve members.
Figure 7:
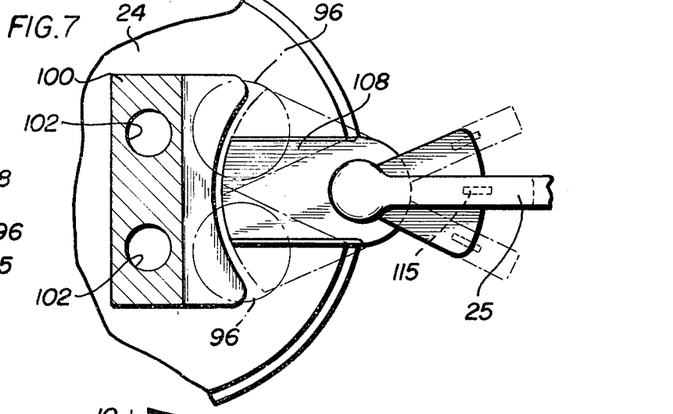
FIG. 7 is a view illustratng the relative position of the lever end that can be employed to effect controlled dispensing of the condiment product.

The structural features of the dispensing unit 20 which enables alternate dispensing of the pressurized products, A and B will now be considered. In this regard, the lever 25 as mentioned above, includes a free end 108 which provides a stop for positioning the valve in the initial condition, and also engage the ends 96 of the valve members 62 to attain movement to the dispensing condition as shown in FIG. 5. In addition to the free end 108, the lever 25 also includes a section 110 that is adapted for gripping and depressing by the operator. With reference to FIGS. 2, 6 and 7, it can be seen that the free end 108 is pivotally connected to the section 110 by a suitable swivel joint 111 and said free end 108 is provided with a tap portion 112 to enable selection of a desired orientation with regard to said valve member end segments 96.

With reference to FIG. 7, the enlarged end segments 96 of the respective valve members 62 are shown in dotted outline, with the free end 108 of the lever 25 in position so as to underlie both said end segments. Accordingly, upon depressing of the lever 25, both valve members 62 will be moved to the discharge position as illustrated and discussed above with regard to FIGS. 4 and 5. The free end 108, due to its pivotal mounting, is also capable of movement to alternate positions from that as shown in full line in FIG. 7; these alternate positions being shown in dotted outline in said FIG. 7. When the free end 108 is in one or the other of the alternate positions (i.e. in dotted outline), it will underlie only one of the end segments 96. Accordingly, upon depression of the lever 25, only the associated valve member will be operated, the other valve member remaining in the initial or supply condition as shown in FIG. 4. Thus, only the condiment controlled by the operated valve member will be dispensed.

With reference to FIG. 6, there is illustrated detent means for maintaining the free end 108 in the desired orientation relative to the various valve members 62. In this regard, the tap portion 112 is provided with a protuberance 113, and the lever section 110 has a flange section 114, in which a series of depressions or slots 115 are formed. The slots 115 are sized to receive the protuberance 113, and thus releasably maintain the free end 108 in a selected orientation relative to the valve member 62.

Accordingly, it can be seen that when the free end 108 is in either or the positions illustrated in dotted outline in FIG. 7, depression of the lever 25 will produce dispensing of but a single condiment product. When the free end 108 is in the position as illustrated in full line, both of the valve members 62 will be actuated and both condiment products A and B will be dispensed from the dispensing head 24.

Figure 8:
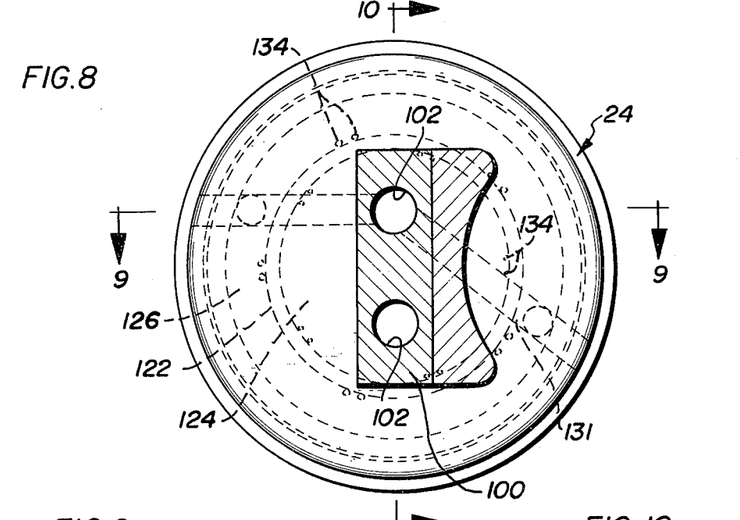
FIG. 8 is a view taken along the line 8—8 of FIG. 2 showing the dispensing head.
Figure 9:
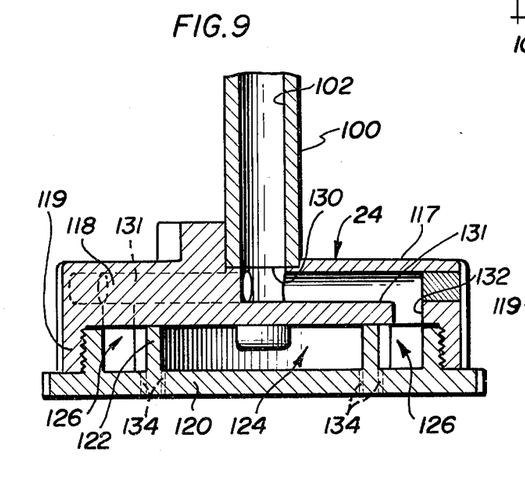
FIG. 9 is a sectional view of the dispensing head taken along the lines 9—9 of FIG. 8.
Figure 10:
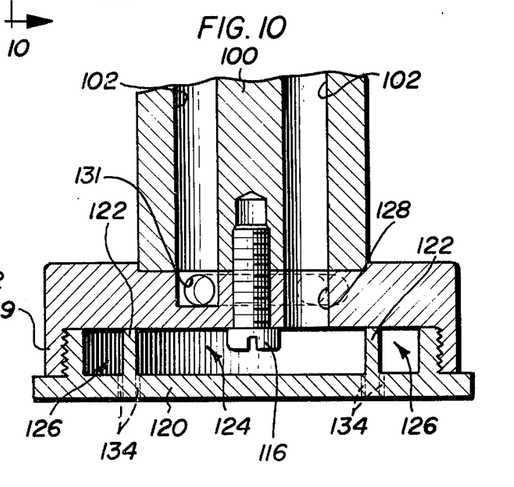
FIG. 10 is a sectional view of the dispensing head taken along the line 10—10 of FIG. 8.

The construction of the dispensing head 24 which maintains a separation of the respective condiment products A and B will now be considered with regard to FIGS. 8–10. It should be recalled that the main body portion 42 of the unit 20 includes a housing section 100 in which the respective discharge passages 102 are formed. Dispensing head 24 is attached to the end of the housing section 100 by a fastener 116 or the like, as shown in FIG. 10. With reference to FIGS. 9 and 10, the dispensing head 24 is defined by a cylindrical, cup-shaped outer section 117 which includes a base wall 118 and an axially extending side wall 119. An end or cup member 120 is secured to the cylindrical section 117 in overlying relation, said end or cup member 120 including an axially extending inner wall 122 which is spaced radially inward of the periphery of said cup member 120 and abuts the lower surface of the base wall 118. There thus is in effect defined a central, circular chamber 124 and an outer, annular chamber 126, said chambers being separated by the annular wall 122.

The base wall 118 further includes a series of ports and passages which provide a path of communication from the discharge passages 102 to one or the other of the chambers 124 and 126. More specifically, a through port 128, as shown in FIG. 10, opens directly to the central chamber 124 and is aligned with a first one of the discharge passages 102. In addition, with reference to FIG. 9, the base wall 118 includes a second port 130 which is aligned with the other of the discharge passages 102. As can be seen, port 130 is not a through port, but is connected to the outer annular chamber 126 by means of one or more transverse passages 131 (FIG. 8 and 9), each of which includes a branch 132 opening to said annular chamber 126. In addition, the wall of the end of cup member 120 is provided with a series of openings 134 which also communicates with the respective chambers 124 and 126, and provide the ultimate outlet openings for the condiment products. Accordingly, it should be noted that the dispensing head 24 maintains continued separation of the respective condiment products, with but a single product being contained in the respective chambers 124 and 126. Thus, the unit 20, as described, is adapted to handle two separate and distinct condiments and to dispense one or the other or both of these condiments without the co-mingling thereof. In addition, said unit provides for metering of the products, such that a predetermined uniform volume of each is dispensed upon each instance of operation of said unit 20. Further, the unit 20 has been designed for ease in disassembly and reassembly for cleaning purposes, and also to minimize dead spaces wherein the condiment product can become trapped and ultimately spoiled.

It is to be understood, that the unit 20 as shown is of a preferred construction for applications where hand held self-contained units are feasible, and indeed similar units having but a single metering chamber, or more than two such metering chambers, may be devised, utilizing the basic principles of the present invention, or alternate arrangements for the respective chambers may be employed without departing from the scope of the invention, as recited in the claims. Concerning this latter point, FIGS. 11–20 disclose an extremely unique and novel valve arrangement which is illustrative of one type of the variation that can be effected with regard to the basic inventive concept. Since the unit of FIGS. 11–20, (designated 20') employs numerous components or elements which are similar to those as discussed with regard to the unit 20 of FIGS. 2–11, the same reference characters, primed (') will be employed for the unit 20'.

Figures 11, 12:
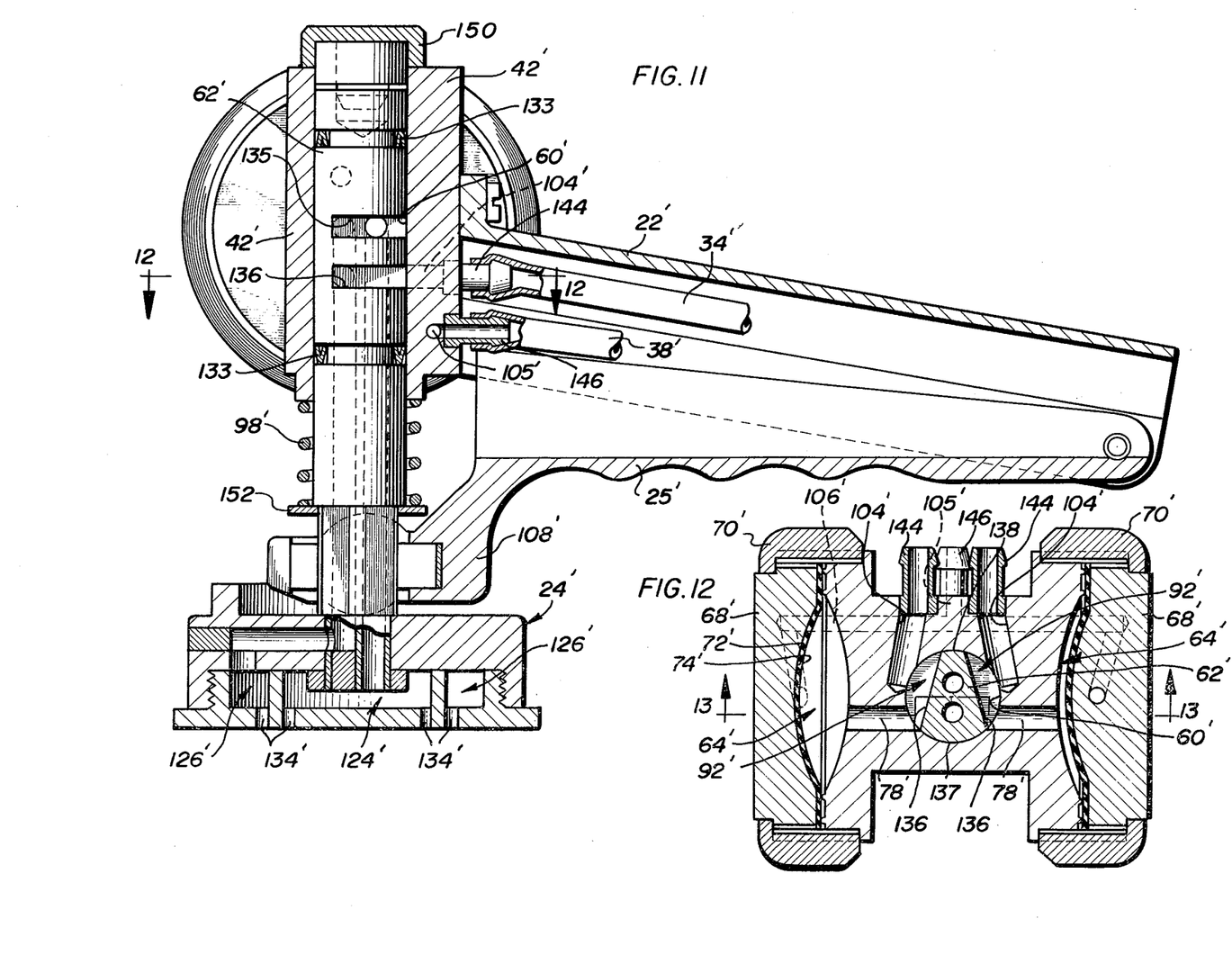
FIG. 11 is a longitudinal partial sectional view taken through a dispensing unit of alternate design.
FIG. 12 is a sectional view taken along the lines 12—12 of FIG. 11, illustrating the condition of the elements of the dispensing unit upon the supply of pressurized condiment products.

Looking now to FIG. 11, the dispensing unit 20' includes a main body section 42' and metering chambers 64', with valve means for effecting supply and discharge of the pressurized products from the metering chambers 64'. Affixed to the main body section 42' is a handle 22' having a manually operable lever 25' which is used to actuate the valve mechanisms, in a manner which will be described.

As mentioned above, the basic construction of the elements which provide the metering chambers 64' is quite similar to that as discussed with regard to unit 20. In this regard, attention is invited to FIGS. 12 and 13, where it can be seen that the main body section 42' includes a pair of oppositely facing concavities 66'. Overlying each concavity 66' is a diaphragm 72' which is clamped in position by a limit plate member 68' held in place by a threaded gland 70'. In the illustrated embodiment, the left hand limit plate member 68, as viewed, includes a concavity 74', while the right hand limit plate member presents a convex surface 130 to the corresponding concavity 66', such that the effective volume of the left hand metering chamber 64' is considerably greater than that of the corresponding right hand chamber 64'.

Unlike the previously discussed unit 20, the dispensing unit 20' includes but a single valve bore 60' and a single valve member 62' slidably disposed in said bore. The valve bore 60' is in communication with each metering chamber 64' through two pair of inlet and outlet ports 78' and 80', each of which open to the bore 60'. The inlet ports 78' are disposed below the outlet ports 80', this orientation being opposite from that as discussed with regard to the unit 20.

Attention is now directed to the overall constructions of the valve member 62' which varies considerably from that as discussed with regard to unit 20. The valve member 62' is of a generally circular cross section and the major portion thereof is in sliding, sealed engagement with the bore 60'. The construction of the valve member 62' which will now be described, can best be understood with reference to FIGS. 12, 13 and 15. To assure against the leakage of the condiments from the main body section 42', sealing elements 133 may be provided, as illustrated, which serve two functions, in that they engage the bore 60' to prevent leakage, as well as to effect a scraping action to remove condiment product from bore 60'. Intermediate and sealing members 133, there are provided two pair of slots; the first pair which are designated by the reference characters 135 are spaced above the second pair, designated by reference character 136. The slots of each pair are disposed at approximately the same level or axial position. The respective slots 135 and 136 are in effect formed as cordial segments, note FIG. 12 with regard to the slots 136 and FIG. 15 relative to slots 135. The slots 136 and 135 cooperate with the bore 60' to define product discharge and product supply chambers 92' and 94', as illustrated. With reference to FIG. 12, it can be seen that the respective product supply chambers 92' are separated each from the other by external surfaces portions 137 and 138 formed on the valve member 62'. These surface portions 137 and 138 are in sliding, sealed contact with the bore 60', thereby precluding the passage of condiment from one chamber to the other. Correspondingly, looking to FIG. 15, it can be seen that the product discharge chambers 94' are separated each from the other in a similar manner by surface portions 140 and 142.

Figure 13:
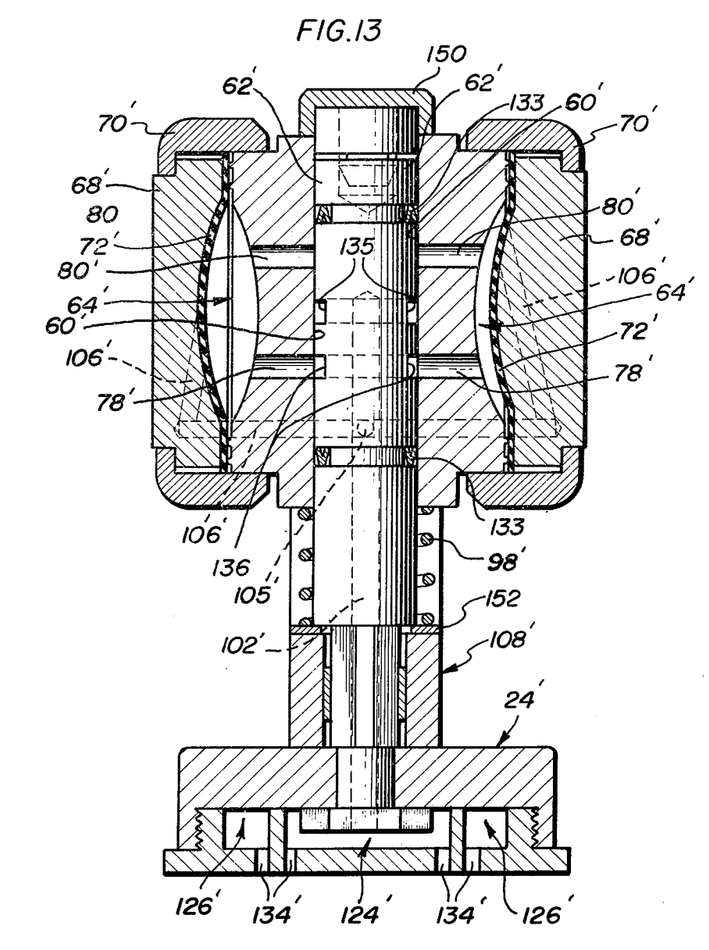
FIG. 13 is a sectional view taken along the line 13—13 of FIG. 12, showing the dispensing unit elements in the supply condition.

As an additional factor, the valve member 62' also includes a stop member 150 affixed to the portion thereof which extends from the upper surface of the body section 42'. The stop member 150 is adapted to engage said upper surface, and thereby define the limit of movement of the valve member 62' downwardly of the bore 60'. At a location on the valve member 62', disposed below the lowest surface of the body section 42', there is provided an abutment ring 152, with a spring member 98' engaged between said abutment member and the lower surface of the body section 42', said spring urging said valve member 62' downwardly to produce engagement of the stop 150 with the upper surface of body section 42'. The orientation of the valve member 62' relative to bore 60' as shown in FIGS. 11 and 13, thus define the initial or product supply position for the unit 20'.

Before discussing the mode of operation of the unit 20', it is believed advantageous to first consider the product supply and discharge passage means employed with regard to said unit 20'. Concerning the supply of pressurized product, attention is invited to FIGS. 11 and 12, where it can be seen that unit 20' includes a handle portion 22' having a hollow center, so that the product supply conduits or lines 34' and 36' leading from the storage containers 26 and 28 may be received within the handle and connected directly with the body portion 42' through the use of fittings 144. The fittings 144, as shown, communicate with laterally offset product supply passages 104' formed in the body 42', which passages open into the bore 60'. Correspondingly, the pressure supply line 38' is also passed interiorly of the handle 22 and is connected to a fitting 146 which communicates with a series of passages 105' and 106' (illustrated in dotted line in FIG. 12) which enable the supply of the pressure medium to the sides of the diaphragms 72' opposite the chambers 64'. Accordingly, it can be seen that pressurized product is supplied to the valve bore 60' in a manner somewhat similar to that as discussed with regard to the unit 20.

Figure 15:
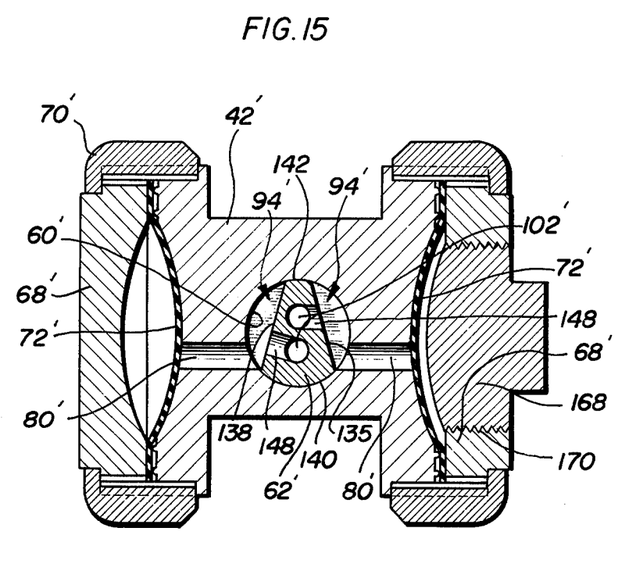
FIG. 15 is a sectional view taken along the lines 15—15 of FIG. 14, with the dispensing unit elements in the dispensed condition.

The product discharge passage arrangement for the unit 20' can best be understood with reference to FIGS. 11 and 15. In this regard, a pair of parallel discharge passages 102' are formed directly in the valve member 62', shown in full line in FIG. 15 and in dotted line in FIG. 11. The discharge passages 102' extend from the bottom of the valve member 62' (i.e. the point of attachment to the dispensing head 24') to a level corresponding to the slots 135, as is shown in FIG. 11. At this point, relatively short, transverse passages 148 are provided, which interconnect each slot 135, and the corresponding product discharge chambers 94' defined thereby, with its respective discharge passage 102'.

As mentioned above, the dispensing head 24' is connected to the lower end of the valve member 62'. Said dispensing head 24' is of the same general construction as that discussed previously with regard to the unit 20. Accordingly, through the use of suitable porting and passages formed in the dispensing head 24', one of the discharge passages 102' is in communication ith the central condiment chamber 124', while the other said passage 102' is connected to the outer, annular chamber 126'.

Figure 14:
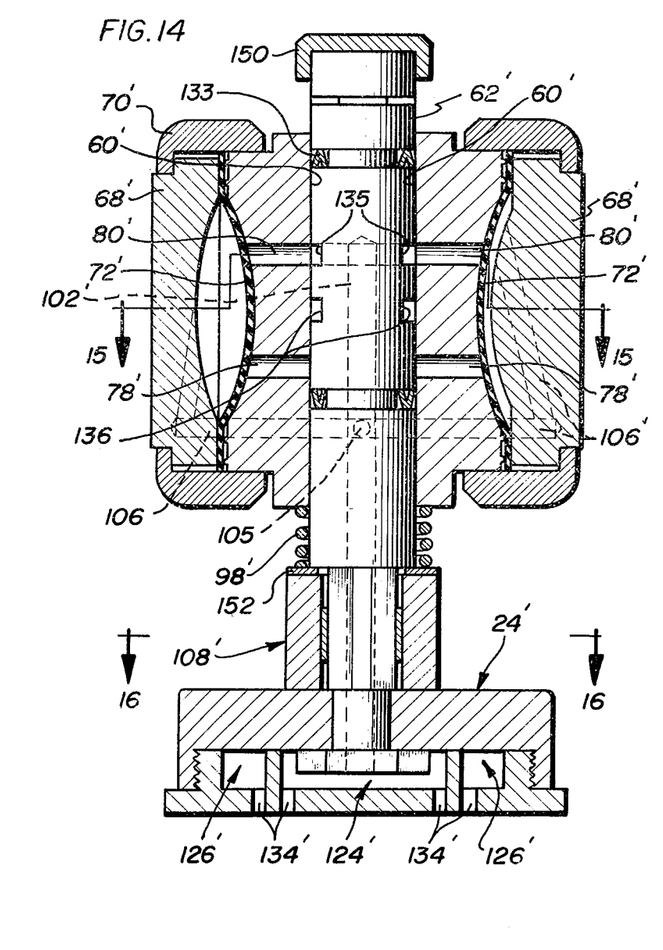
FIG. 14 is a view similar to FIG. 13, but illustrating the condition of the various dispensing unit elements upon the dispensing of the condiment products.

A discussion of the operation of the dispensing unit 20' will now be undertaken. The initial or product supply position for the respective elements is shown in FIGS. 11, 12 and 13, while FIGS. 14 and 15 illustrate the condition for said elements upon acutation of the unit to the dispensing condition.

With the valve member 62' in the initial position, the slots 136 which define supply chambers 92' will be at a level which establishes communication between the inlet passages 104' and the respective inlet ports 78', as shown in FIG. 12. Accordingly, pressurized product may now pass from the supply lines 34' and 36' into the respective metering chambers 64' via passage 104', ports 78' and supply chambers 94'. Similar to the arrangement as discussed previously, the pressurized product will be maintained at a level greater than that of the pressure medium supplied to the opposite side of the diaphragms 72'. Accordingly, resultant force will be produced which will cause the diaphragms 72' to expand into engagement with the limit plate members 68', thereby enabling complete filling of the respective metering chambers 64'. Due to the sealed engagement of the surface portions 137 and 138 with the bore 60', no leakage of intermingling of the respective condiment products will occur during supply.

When it is desired to effect dispensing of the condiment product from the chambers 64', the lever 25' is depressed. The lever 25' includes an end segment 108' which is bifurcated and engages the underside of the abutment plate 152, so that depression of said lever will cause the valve member 62' to move upwardly from the conditions as shown in FIG. 13 to that as illustrated in FIG. 14. As upward movement of the valve member 62' occurs, the slots 136 are moved out of alignment with the product supply passages 104', thereby interrupting the supply of the pressurized products to the metering chambers 64'. Correspondingly, said movement will produce alignment of discharge chambers 94' with the outlet ports 80' for each metering chamber, as shown in FIG. 15, which chamber 94' communicates with discharge passages 102' and are thus at atmospheric pressure. Due to the interruption of supply of pressurized products, and the opening of the metering chambers 64' to the discharge passages 102', a pressure differential across the diaphragms 72' will be created, which is opposite to that as discussed above. This pressure differential and the resultant force created will produce movement of the diaphragms 72' away from the limit plate member 68' to the position as shown in FIGS. 14 and 15. This movement forces condiment product from the respective metering chambers 64' into the discharge passages 102', thereby resulting in the dispensing of a predetermined volume of each condiment from the dispensing head 24' in a manner similar to that as discussed previously with regard to unit 20.

Dispensing unit 20' is designed to obtain alternate or joint dispensing of the respective condiment products. The structure which enables the obtaining of alternate dispensing will now be considered. In this regard, it should be noted initially, that the respective slots 135 and also slots 136 are disposed at an angle to each other, such that the surface portions 137 and 140 are of a greater arcuate extent than the oppositely disposed surface portions 138 and 142. The purpose for this will become clear from the following discussion concernings FIGS. 16–20.

Figure 17:
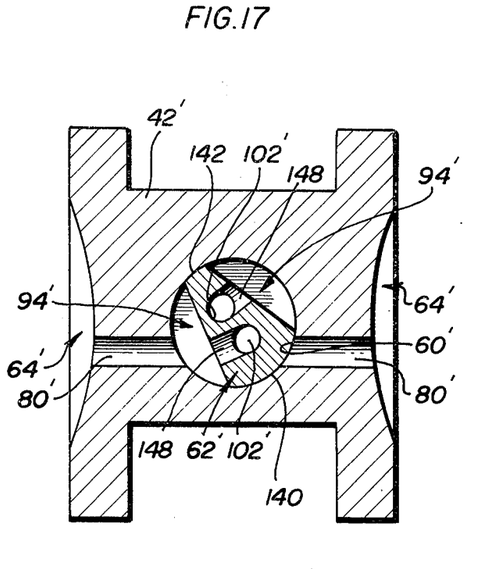
FIGS. 17 and 18 are views similar to those of FIGS. 12 and 15, respectively, illustrating the disposition of the valve member for the supply and dispensing of condiments in conjunction with the left hand metering chamber, as viewed.
Figure 18:
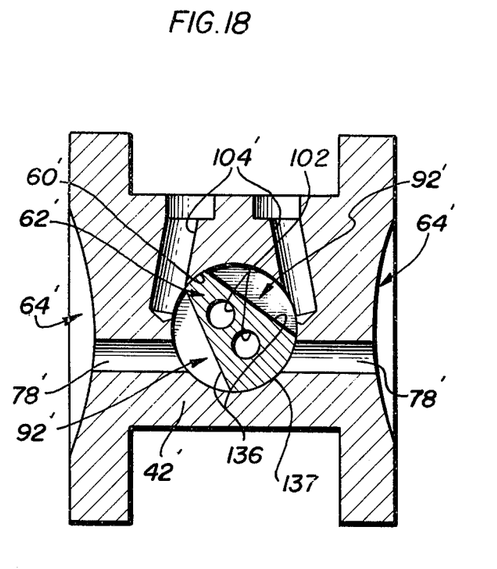

The angular or rotative disposition of the valve member 62' relative to the bore 60' as shown in FIGS. 12 and 15 and as discussed above, is such that the supply and discharge of pressurized product will occur with regard to both metering chambers 64'. This angular or rotative disposition of the valve member 62' with respect to bore 60' may be altered, however, as said valve member 62' is rotatably mounted in the bore 60'. In this regard, if the valve member 62' is rotated in the counter-clockwise direction, from the intermediate position as shown in FIGS. 12 and 15, the orientation as shown in FIGS. 17 and 18 will result. Correspondingly, if the valve member 62' is rotated in a clockwise direction, the orientation of the valve member 62' with respect to bore 60' as shown in FIGS. 19 and 20 will be produced.

Looking first to FIGS. 17 and 18, it can be appreciated that the valve member 62' has been rotated in a counter-clockwise direction from that as illustrated in FIGS. 12 and 15. When this occurs, the surface portion 137 will be moved into position to block the inlet port 78' for the right hand chamber 64', thereby precluding or interrupting the supply of pressurized product to said chamber. This counter-clockwise rotation of the valve member 62', however, will not destroy or interrupt the supply of pressurized product to the left hand chamber 64', as the corresponding inlet port 78', supply chamber 92' and supply passage 104' for said left hand metering chamber remain in alignment. Correspondingly, when the valve member 62' is moved upwardly to the dispensing condition, the arrangement as shown in FIG. 17 will be obtained. That is to say, the surface portion 140 interposed between the respective discharge chambers 94' will block the discharge passage 80' for the right hand chamber, while the left hand metering chambers 64' is in communication with its associated discharge passage 102'. Accordingly, dispensing of only the pressurized product in the left hand chamber 64' will be obtained.

Figure 19:
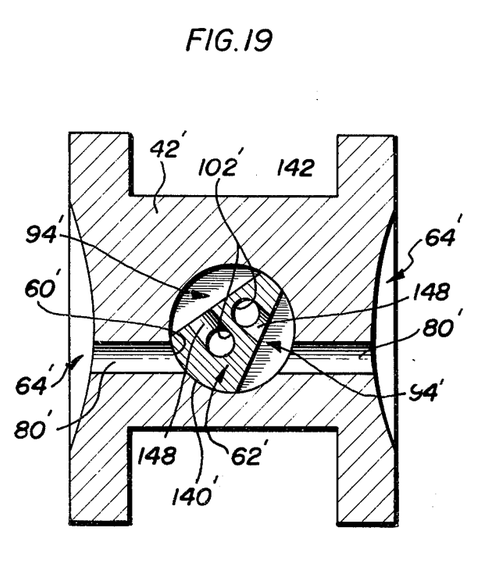
FIGS. 19 and 20 are views similar to FIGS. 17 and 18, but illustrating the disposition of the valve member for the supply and dispensing of condiment from the right hand metering chamber, as viewed.
Figure 20:
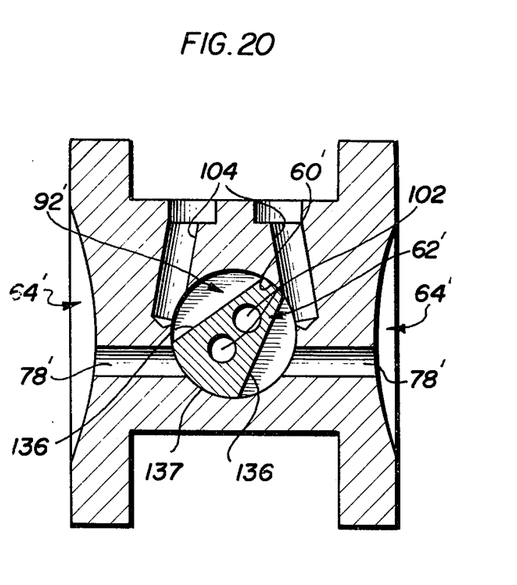

FIGS. 19 and 20 illustrate the conditions existing upon rotation of the valve member 62' in a clockwise direction from the intermediate position as shown in FIGS. 12 and 15. As shown, the surface portions 137 and 140 will now block the inlet ports 78' and the outlet ports 80', respectively, for the left hand chamber 64', while normal supply and discharge of pressurized product can take place with regard to the right hand chamber 64'. Thus, upon each operation of the unit 20', only product from the right hand chamber 64' will be dispensed.

Figure 16:
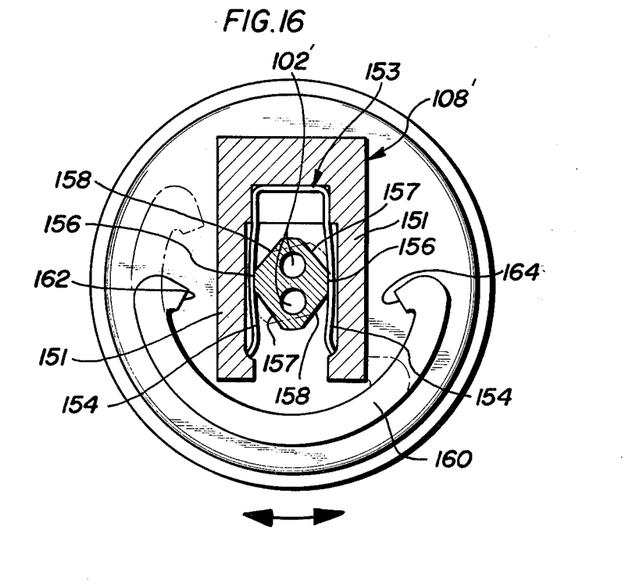
FIG. 16 is a sectional view taken along the lines 16—16 of FIG. 14, illustrating the means to retain the valve member of the dispensing unit in a desired orientation.

Attention is now directed to FIG. 16, where there is shown a preferred arrangement for obtaining releasable positioning of the valve member 62' in the intermediate position of FIGS. 12 and 15, or either of the clockwise or counter-clockwise dispositions of FIGS. 17–20. The bifurcated free end 108' of the lever 25' provides a pair of arms 151 which surround or are disposed on opposite sides of a segment of the valve member 62'. Carried by said arms 151 is a U-shaped spring member 153 having parallel biasing elements 154. The portion of the valve member 62' bracketed by the arms 151 is formed to provide three pair of opposed flat surfaces, 156, 157 and 158.

When the valve member 62' is in the intermediate position, the biasing elments 154 will engage the surfaces 156, as shown in full line in FIG. 16, thereby releasably maintaining the valve member 62' in said intermediate orientation. Rotation of the valve member 62' in the clockwise direction to obtain the orientation as shown in FIGS. 19 and 20 will bring the surfaces 157 into engagement with the biasing elements 154 (as shown in dotted outline in FIG. 16), thereby releasably maintaining the valve member 62' in the desired orientation to produce dispensing from the right hand metering chamber 64' only. Correspondingly, rotation of the valve member 62' in the counter-clockwise direction will bring the surfaces 158 into engagement with the biasing elements 154 to maintain the positioning required for dispensing from the left hand metering chamber 64'.

Further, it should be noted that the dispensing head 24' is affixed to the valve member 62' and will rotate therewith. On the upper surface of said dispensing head 24', there is provided an upstanding, arcuate flange 160 terminating in stop surfaces 162 and 164. The stop surfaces 162 and 164 will abut the arms 151 when the valve member 62' is rotated in either the clockwise or counter-clockwise direction, thus defining the limits of movement of said valve member, and permitting attainment of the proper disposition of said valve member 62' relative to the valve bore 60' and the ports and passages opening into said bore.

As an additional feature, the right hand portion of FIG. 15 illustrates a possible modification that may be employed with either the unit 20 or the unit 20'. In this regard, it will be recalled that the units 20 and 20' have been designed so that the limit plate member 68 and 68' are replaceable to obtain varying volumes for the metering chambers 64 and 64'. It is envisioned, as a supplementary or alternate feature, that the limit plate members 68 and 68' may be provided with a central plug 168 which is threaded into a bore 170 formed in said limit plate members 68'. The plug 168 has an external tab or the like which enables the relative axial position of the plug with respect to the bore to be altered. In this regard, as the plug is moved toward and away from the diaphragm 72', the effective volume of the metering chambers 64' will be altered. This arrangement thus enables adjustment in the volume of pressurized product being dispensed without the necessity of changing limit plate members.

For purposes of illustration and discussion, two preferred embodiments of hand held types of dispensing units, constructed in accordance with the present invention, have been illustrated and described in conjunction with the basic system of the invention. The invention however is not limited to hand held, self-contained units. In this regard, where the volumes to be dispensed are large, the size of the metering chamber would preclude a self-contained hand held unit. In these applications, or if desired for the application of condiments, the dispensing unit could be stationary and mounted at a convenient location, with flexible hosing and a nozzle being employed to effect ultimate dispensing. In this regard, operation of the valve mechanism could be effected by use of a tugger or control switch on the nozzle, with the desired actuation of the valve produced by use of cable, solenoids, hydraulic systems or the like, as are well known in the art. Also, while axially movable valve mechanisms are shown and described, rotary type valves could be used to achieve the desired valving action. Thus, it is envisioned that those skilled in the art may well devise various changes, alterations or substitutions which may vary from the particular structures disclosed, without departing from the spirit and scope of the invention; as such, the present invention is not limited to the disclosed embodiments, but rather is defined by the claims appended hereto.

The invention is claimed as follows:

1. A dispensing unit for use in the controlled, metered dispensing of a liquid product, said unit adapted for use in a system wherein said product is supplied under pressure, said dispenser comprising: a body assembly, at least one metering chamber and discharge passage means provided in said body assembly, with a flexible diaphragm forming a wall of said metering chamber, means for establishing a force on the side of said diaphragm opposite said metering chamber, and control means operable to effect supply of pressurized product to said metering chamber to create a pressure differential across said diaphragm in a direction which will overcome any force established on said oppoiste side, thereby permitting complete filling of said metering chamber with pressurized product said control means also being operable to produce blockage of pressurized product to said metering chamber while establishing communication between said metering chamber and said discharge passage means, such that a pressure differential across said diaphragm will then be created in the opposite direction forcing a predetermined volume of product out of said metering chamber.

2. A dispensing unit as defined in claim 1, wherein said body assembly include inlet and outlet port means communicating with said metering chamber, and said control means includes a valve member which is selectively operable between a first position and a second position, such that in the first position, pressurized product is supplied to said metering chamber, and when moved to said second position, the supply of pressurized product to said metering chamber is blocked and said metering chamber is placed in communication with said discharge passage means to produce dispensing of a predetermined volume of liquid product.

3. A dispensing unit as defined in claim 2, wherein said inlet and outlet port means are defined by separate inlet and outlet ports, with said inlet port being open and said outlet port blocked when said valve member is in the first position, and said inlet port is blocked and said outlet port is open when said valve member is in the second position.

4. A dispensing unit according to claim 2, wherein said body assembly includes a bore with said valve member movably disposed in said bore, and said inlet and outlet port means communicating with said bore, said body assembly further including a handle and a lever having one end thereof pivotally connected to said handle with the other in operative engagement with said valve member, biasing means urging said valve member to said first position, such that upon engagement of said lever by an operator, said valve memer may be moved to said second position to effect dispensing of said liquid product.

5. A dispensing unit as defined in claim 2, wherein said discharge passage means communicates with said bore and there is further provided a liquid product inlet passage formed in said body assembly and communicating with said bore at a location axially spaced from said discharge passage means, said valve member having first and second reduced diameter sections disposed on opposite sides of a valve section which is sized such that the circumferential surface thereof is in engagement with said bore and is adapted to effect blocking of said inlet and outlet port means, said reduced diameter sections cooperating with said bore to define product inlet and product outlet chambers, which chambers provide communication between said inlet and outlet port means and said supply passage and discharge passage means, respectively.

6. A dispensing unit according to claim 1, wherein said means for establishing a force on the side of said diaphragm opposite said metering chamber includes passage means formed in said body assembly and adapted for connection to a source of pressure thereby enabling the pressurization of the area behind said diaphragm.

7. A dispensing unit according to claim 1, wherein said body assembly includes a main body section having a first concavity formed therein, a limit plate member having a second concavity formed therein, and means mounting said limit plate member in opposed face-to-face relation with said main body section with said diaphragm being clamped therebetween, and said concavities cooperating with said diaphragm to define said metering chamber, such that said limit plate member limits the expansion of said diaphragm during the introduction of pressurized product into said metering chamber, whereby the effective volume of said metering chamber may be varied as desired by the use of limit plates having concavities of different dimensions.

8. A dispensing unit according to claim 1, wherein said body assembly includes a main body section having a concavity formed therein and a limit plate member mounted to said main body section to face-to-face engagement with said diaphragm clamp between said limit plate member and said main body section, said limit plate member limiting the expansion of said diaphragm upon the introduction of pressurized product into said metering chamber and thereby defining the effective volume of said metering chamber, said limit plate member including a plug threadedly engaged in a bore formed in said limit plate member with the end of said plug providing the expansion limiting surface thereof, such that the relative position of said plug may be altered to vary the effective volume of said metering chamber.

9. A dispensing unit according to claim 1, wherein said body assembly includes a pair of metering chambers and separate control means for each said chamber in a form of a pair of valve members slidably mounted with respect to said body assembly, said body assembly including a handle, with a lever having one end pivotally mounted thereto and the other end disposed for engagement with said valve members, such that upon movement of said handle, said valve members may be operated to effect dispensing of liquid products from each of said metering chambers.

10. A dispensing unit according to claim 9, wherein said other end of said lever includes a relatively movable section which can be positioned to effect engagement with one or the other, or both of said valve members.

11. A dispensing unit according to claim 1, wherein said body assembly includes a pair of metering chambers, each having a flexible wall defined by a diaphragm and disposed on opposite sides of a central bore formed in said body assembly, inlet and outlet port means being provided for each said metering chamber, which inlet and outlet port means establish a path of communication from said chambers to said central bore, a pair of liquid product supply passages formed in said body assembly and opening to said bore, said control means including a valve member slidably mounted in said bore for axial movement between a first position and a second position, said valve member having recess means formed therein, which recess means define with said bore pair of product supply chambers, each separated from the other by surface portions of said valve member in engagement with said bore, such that when said valve member is in said first position, said product supply chambers provide a path of communication from said product supply passages enabling pressurized product to enter said metering chambers, movement of said valve member to said second position blocking the supply of pressurized product and establishing a path of communication from said metering chambers to the discharge passage means.

12. A dispensing unit as defined in claim 11, wherein said valve member includes additional recess means which cooperate with the bore in said body assembly to define a pair of separated product discharge chambers spaced axially of said pair of product supply chambers, which product discharge chambers establish a path of communication from said metering chambers to the discharge passages means when said valve member is in said second position.

13. A dispensing unit according to claim 12, wherein said discharge passage means are provided by a pair of parallel, axially disposed passages formed in said valve member, said discharge passages each having one end opening to an end of the valve member, and the opposite end communicating with one of the respective product discharge chambers.

14. A dispensing unit as defined in claim 13, further including a dispensing head mounted on the end of said valve member, said dispensing head including a pair of separate passage means which define dispensing openings, one of said passage means in communication with a first one of said discharge passages and the other in communication with the second of said discharge passages, such that the liquid product metered by each chamber can be dispensed separately and without mixing thereof.

15. A dispensing unit as defined in claim 11, wherein said recess means in said valve member are defined by a pair of slots formed therein and disposed generally transverse to the axis of said valve member, with surface portions provided between said slots, which surface portions engage the bore to achieve a sealed sliding contact, said valve member being rotatably mounted in said bore for movement between two limit positions, such that when said valve member is in a selected intermediate positions, such that when said valve member is in a selected intermediate position, there is produced an orientation of the elements of said unit such that liquid product is supplied to both said metering chambers, with movement of said valve member to one or the other of said limit position causing one of said surface portions to effect blockage of the supply of liquid product to one of said metering chambers, with the supply port of the other metering chamber remaining in communication with its respective supply passage through the associated product supply chamber, such that by selecting the relative rotative position of said valve member, liquid product may be dispensed from one or the other, or both of said metering chambers upon movement of said valve member from the first axial position to the second axial position.

16. A unit as defined in claim 15, further including a second pair of recessed means in the nature of slots formed in said valve member at an axial location removed from said product supply chamber defining slots, said second pair of slots being separated by surface portions in sealed, sliding engagement with the bore, said second slots defining with the bore a pair of separate product discharge chambers which are oriented with respect to said first slots, such that upon positioning of the valve member to one of said limit positions to block the supply of liquid product to a selected one of said metering chambers, subsequent axial movement of said valve member to said second axial position said surface portions will maintain blockage of said one metering chamber while the other of said metering chambers will be in communication with its respective product discharge chamber, thereby enabling dispensing only of the liquid product from said other metering chamber.

17. A unit as defined in claim 15, further including positioning means for releasably retaining said valve member in said intermediate oreintation, or at either one of said first or second limit positions.

18. A dispensing unit as defined in claim 17, wherein said positioning means comprises three pair of opposed flat surfaces formed on an exterior segment of said valve member, and stationary spring means carried by said body assembly and including a pair of opposed spring arms engaging one of said pair of opposed flat surfaces, depending upon the relative positioning of said valve member.

19. A dispensing unit for the controlled, metered dispensing of a liquid product, and adapted for use in a system wherein a product is suppled to said unit under pressure, said dispensing unit comprising, a body assembly including; a metering chamber having a flexible diaphragm forming a wall thereof, a bore, product supply and product discharge passages opening to said bore, inlet and outlet port means for said chamber also opening the said bore, a valve member disposed in said bore for movement between a first position and a second position, said valve member including means defining with said bore a product supply chamber and a product discharge chamber separated each from the other by a surface portion of said valve member in engagement with said bore, and pressure supply passage means formed in said body assembly and communicating with the side of the diaphragm opposite said metering chamber, which pressure supply means is adapted for connection to a source of pressure such that a pressure medium may be introduced to said opposite side to produce a force on said diaphragm, and limiting means disposed on said side of said diaphragm opposite said chamber, said valve member when in said first position establishing a path from said product supply passage to said metering chamber through said product supply chamber, such that pressurized product may enter said metering chamber to create a pressure differential across said diaphragm sufficient to overcome the force on the opposite side thereof and move said diaphragm into engagment with said limiting means thereby permitting the complete filling of said metering chamber, with movement of said valve member to said second position blocking the supply of pressurized product to said metering chamber and placing said discharge passage in communication with said metering chamber through said product discharge chamber to produce a pressure differential across said diaphragm in an opposite direction, causing said diaphragm to move away from said limiting means and toward said inlet and outlet port means thereby forcing a predetermined volume of product from said metering chamber.

20. A dispensing unit as defined in claim 19, wherein said inlet and outlet port means are provided by a pair of separate ports axially spaced along said bore, such that a continuous path of said liquid product is provided which reduces the dead space where product can accumulate and spoil.

21. A unit as defined in claim 19, wherein said body assdembly includes a main body section having a concavity formed therein, and said limit means is provided by a limit plate member releasably secured to said main body section with said diaphragm clamped therebetween, such that limit plate members having differing configurations can be employed to vary the effective volume of said metering chamber.

22. A dispensing system for use in the controlled, metering dispensing of a liquid product, said system comprising; a container for liquid product adapted to be operably connected with a source of pressure to attain pressurized storage of said product at a selected pressure level; a dispensing unit having at least one metering chamber defined by a relatively movable member, and product discharge passage means formed in said unit, liquid product supply means for establishing connection from said container to said dispensing unit such that pressurized product may be supplied to said metering chamber; said dispensing unit further including valve means for selectively establishing communication between said metering chamber and either said liquid product supply means or said discharge passage means; means adapted to operatively connect said source of pressure to the side of said relatively movable member opposite said metering chamber, said means including pressure reduction apparatus such that the pressurized product is at a higher pressure level than the pressure medium supplied to the side of said diaphragm opposite said metering chamber, whereby the introduction for pressurized product to said metering chamber establishes a pressure differential across said movable member, moving said wall member to enable complete filling of said metering chamber, with the operation of said valve means to establish a path from said metering chamber to said product discharge passage producting a pressure differential across said movable member in the opposite direction to produce movement of said wall member sufficient to effect the discharge of a predetermined volume of liquid product from said dispensing unit.

23. A system as defined in claim 22, wherein said dispensing unit includes at least a pair of metering chambers and said system includes a corresponding number of liquid product containers, and said dispensing unit including valve means operable to dispense liquid product from one or the other or both of said metering chambers.

24. A system according to claim 23, wherein said valve means includes separate valve members for each metering chamber, said valve members inluding actuator segments extending from said dispensing unit, said dispensing unit including means for engaging one o the other or both of said actuator segments so as to produce the desired movement of said valve members to attain dispensing of one or the other, or both of said liquid products.

25. A system as defined in claim 22, including limit means against which said movable member is engaged during filling of said metering chamber.

26. A system as defined in claim 25, wherein said dispensing unit includes a body assembly having a main body member and a plate member removably mounted to said body member, at least said main body member having a concavity formed therein with a flexible diaphragm clamped between said main body member and said plate member to overlie said concavity, with said flexible diaphragm providing said relatively movable member for the metering chamber, said plate member providing said limit means to determine the degree of movement of said diaphragm upon the introduction of pressurized product into said metering chamber.

27. A system as defined in claim 26, wherein said plate member includes a second concavity in opposed relation to the concavity formed in said main body portion, said plate member being removable and replaceable to vary the effective volume of said metering chamber.

28. A dispensing unit for the controlled metered dispensing of at least two different pressurized liquid products, said dispensing unit including: a body assembly having a pair of spaced metering chambers, each said metering chamber defined by a relatively movable wall section; limit means on the side of each said moveable wall section opposite said chambers, a bore formed in said body assembly, inlet and outlet port means for each metering chamber communicating with said bore, liquid product supply and discharge passage means formed in said body assembly for each metering chamber which also communicates with said bore, a valve member slidably disposed in said bore, said valve member including recess means formed therein which define with said bore a separate supply chamber and a separate discharge chamber for each metering chamber, the respective supply and discharge chambers being sealed each from the other by surface portions of the valve member in engagment with said bore, means enabling the establishment of a force on the side of said movable wall section opposite the associated metering chamber, said valve member being movable in said bore from a first axial position to a second axial position to attain the dispensing of a predetermined volume of pressurized product from each said metering chamber, such that when in said first axial position, said supply chambers establish a path of communication from the respective supply passages to the metering chambers, which enable pressurized product to enter each said chamber and produce a force differential across the associated relatively movable wall section, causing said wall section to move into engagement with the respective limiting means thereby insuring complete filling of said metering chambers, with movement of said valve member to said second axial position terminating the supply of pressurized product to said metering chambers while aligning said discharge chambers with said metering chambers to produce a force differential in an opposite direction, which causes said wall sections to move away from the respective limit means to expel a predetermined volume of liquid product from each metering chamber.

29. A dispensing unit according to claim 28, wherein said movable wall sections for said chambers are defined by flexible diaphragms clamped into position to overlie cavities formed in the body assembly.

30. A dispensing unit as defined in claim 28, wherein said inlet and outlet port means for each said metering chamber are provided by separate inlet and outlet ports opening to said bore at spaced locations, so that the paths for the liquid product through said metering chambers are continuous, thus avoiding any dead spaced wherein pressurized product can accumulate and spoil.

31. A dispensing unit according to claim 28, and further including biasing means urging said valve member to said first position, and said body assembly including a handle with lever means mounted thereon for engaging said valve members from movement to said second position.

32. A dispensing unit as defined in claim 28, wherein said valve member is mounted for rotation relative to said bore between opposed limits, such that when in an initial position, intermediate said limits, pressurized product will be supplied to and expel from both metering chambers upon operation of said valve member, with rotative movement of said valve to either of said limit positions effecting blockage of the supply of pressurized product to one of said metering chambers by the surface portions separating the respective supply chambers, while permitting the supply of pressurized product to the other of said metering chambers, and correspondingly, upon movement of said valve member to said second axial position, the surface portions separating said discharge chambers will block the discharge of pressurized product from said one metering chamber while enabling dispensing the pressurized product from the other of said metering chambers, such that the relative rotative position of said valve member may be adjusted to dispense one or the other or both pressurized products.

* * * * *

UNITED STATES PATENT AND TRADEMARK OFFICE
CERTIFICATE OF CORRECTION

PATENT NO. : 4,032,044
DATED : June 28, 1977
INVENTOR(S) : Jac B. Flynn, Jerry C. Janquart and Werner K. Priese It is certified that error appears in the above-identified patent and that said Letters Patent are hereby corrected as shown below:

```
Column  7, line 42, "valve" should be --valves--;
Column  8, line 16, "or" should be --of--;
Column 10, line  4, "and" should be --the--;
Column 11, line 17, "ith" should be --with--;
Column 11, line 25, "acutation" should be --actuation--;
Column 11, line 44, "of" should be --or--;
Column 11, line 63, "products" should be --product--;
Column 14, line 39, after "blockage of" insert --the supply of--
Column 14, line 47, "include" should be --includes--;
Column 15, line 50, "to" should be --in--;
Column 16, line 25, after "bore" insert --a--;
Column 16, line 44, "passages" should be --passage--;
Column 17, lines 3 and 4, cancel "such that when said valve
           member is in a selected intermediate positions,";
Column 17, line 59, "the" should be --to--;
Column 18, line 28, "of" should be --for--;
Column 18, line 40, "metering" should be --metered--;
Column 19, line 15, "o" should be --or--;
Column 20, line 32, "spaced" should be --spaces--
```

Signed and Sealed this

Fifteenth Day of November 1977

[SEAL]

Attest:

RUTH C. MASON
Attesting Officer

LUTRELLE F. PARKER
Acting Commissioner of Patents and Trademarks